(12) United States Patent
Terrell

(10) Patent No.: US 9,801,769 B2
(45) Date of Patent: Oct. 31, 2017

(54) BEDPAN SYSTEM

(71) Applicant: Jamie Leanne Terrell, Victoria, TX (US)

(72) Inventor: Jamie Leanne Terrell, Victoria, TX (US)

( * ) Notice: Subject to any disclaimer, the term of this patent is extended or adjusted under 35 U.S.C. 154(b) by 0 days.

(21) Appl. No.: 14/990,460

(22) Filed: Jan. 7, 2016

(65) Prior Publication Data

US 2017/0196746 A1  Jul. 13, 2017

(51) Int. Cl.
*A61G 9/00* (2006.01)
*A47K 11/02* (2006.01)

(52) U.S. Cl.
CPC ............. *A61G 9/003* (2013.01); *A47K 11/02* (2013.01)

(58) Field of Classification Search
CPC ..................................................... A61G 9/003
USPC ..................................................... 4/450–457
See application file for complete search history.

(56) References Cited

U.S. PATENT DOCUMENTS

| | | | | |
|---|---|---|---|---|
| 2,173,686 A * | 9/1939 | Hamje | ................... | A61G 9/003 150/154 |
| 3,377,631 A * | 4/1968 | Whitney | ................ | A61G 9/003 4/452 |
| 3,540,433 A * | 11/1970 | Brockman | ......... | A61B 10/0038 4/144.1 |
| 3,713,178 A * | 1/1973 | Mallette | ................. | A61G 9/003 4/451 |
| 3,942,196 A * | 3/1976 | Mills | ...................... | A61G 9/003 4/144.2 |
| 4,899,399 A * | 2/1990 | Young | ..................... | A61G 9/003 4/450 |
| 5,224,223 A * | 7/1993 | Royal | ..................... | A61G 9/003 4/451 |
| 5,375,270 A * | 12/1994 | Demers, Jr. | .............. | A61G 9/02 4/300.3 |
| 5,778,461 A * | 7/1998 | Attaway | ................ | A61G 9/003 4/450 |
| 5,819,334 A * | 10/1998 | Maze | ..................... | A61G 9/003 4/450 |
| 6,189,162 B1 * | 2/2001 | Tanner | .................. | A47K 11/105 4/450 |
| 6,351,858 B1 * | 3/2002 | Toia | .......................... | A61G 9/00 220/4.01 |
| 2008/0083060 A1 * | 4/2008 | Beers | ..................... | A61G 9/003 4/455 |
| 2013/0269095 A1 * | 10/2013 | Finley | .................... | A61G 9/003 4/453 |
| 2016/0051176 A1 * | 2/2016 | Ramos | ................... | A61B 5/208 600/573 |

* cited by examiner

*Primary Examiner* — Lori Baker

(74) *Attorney, Agent, or Firm* — Law Office of Jeff Williams; J. Oliver Williams

(57) ABSTRACT

The present application includes a system for separating solid and liquid waste through a bedpan. The system includes the bedpan, a screen member, and a storage member for liquid waste. Liquid waste is passed through the screen within the bedpan and into the storage member. The storage member is externally located outside of the bedpan. The storage member is configured to visual access by a medical professional to permit an ease of measurement and detection of liquid waste collected. The storage member is detachable and can be closed to prevent spillage during transportation.

20 Claims, 2 Drawing Sheets

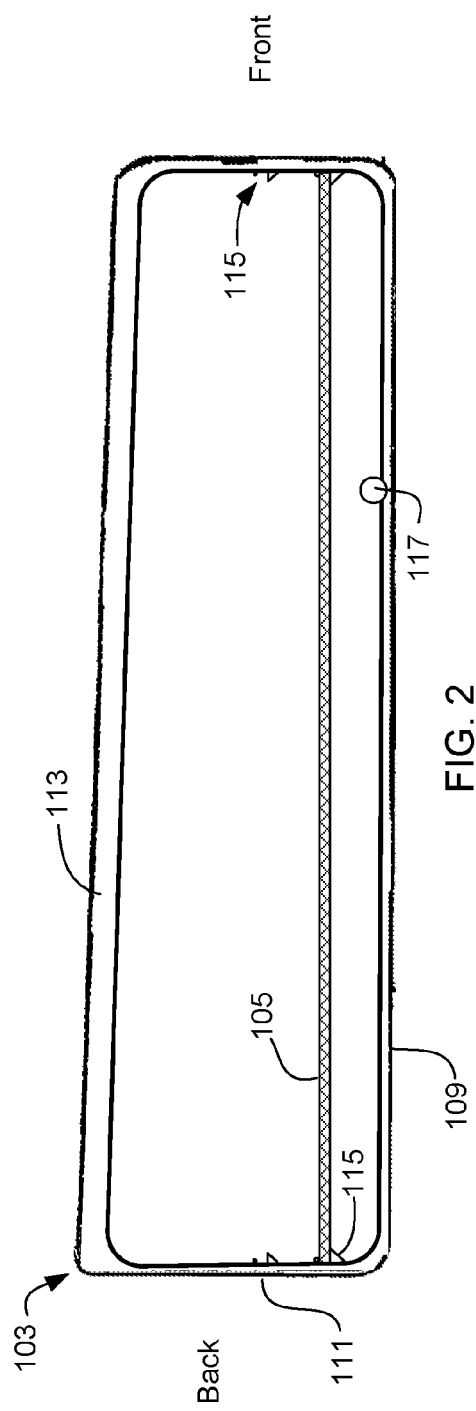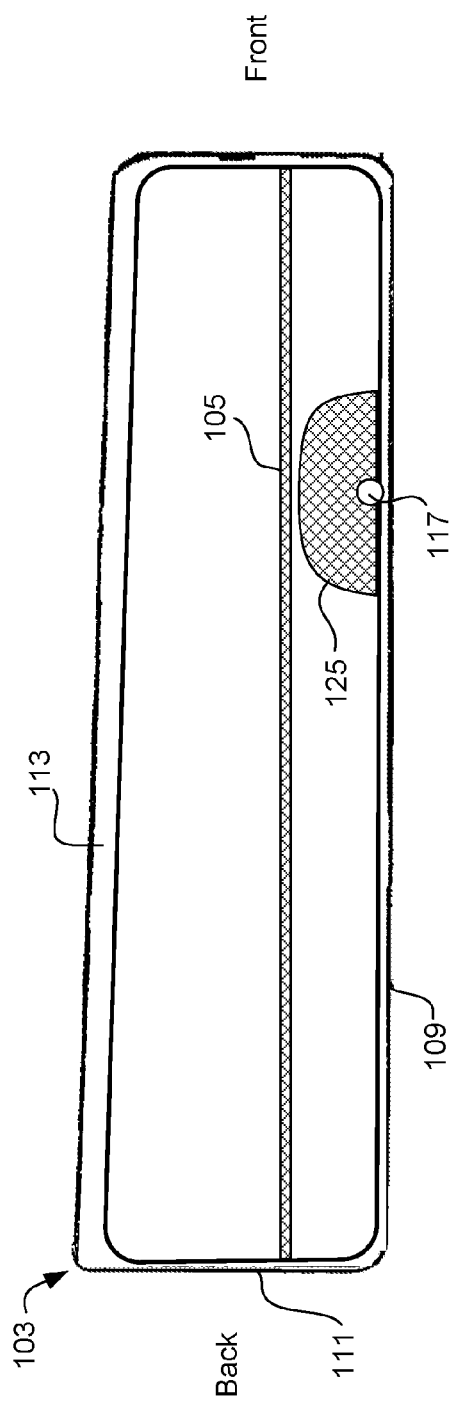

BEDPAN SYSTEM

BACKGROUND

1. Field of the Invention

The present application relates generally to a bodily waste collecting system, and more particularly to a bed pan configured to separate and store liquid and solid waste.

2. Description of Related Art

A bedpan or bed pan is an object used for the toileting of a bedridden patient in a health care facility. Originally, bedpans were manufactured using metal materials. Today however, they are usually made of a metal, glass, or plastic receptacle. They may be used for both urinary and fecal discharge. Current bedpans include numerous problems. Some current bedpans cannot be used for both liquid and solid waste. Other bedpans can receive both liquid and solid waste, however, these bedpans are impractical because the liquid and solid waste are received in a single compartment being allowed to comingle. This necessitates an attendant to separate the liquid waste from the solid waste. Separation of the waste is important and necessary to measure the volume of the liquid waste. One problem associated with bedpans is that the attendant must pour the liquid waste into a graduated cylinder without also pouring the solid waste. Another problem associated with these bedpans is that the attendant must use an additional container, e.g., the graduated cylinder, to measure the liquid waste.

In general, a large drawback to conventional bedpans is the commingling of fecal matter with the urine. Bedpans often become full and their location in relation to a patient makes them difficult to maneuver. Spillage of the urine is a large concern. With many patients having open wounds from surgery, any spillage greatly increases the risks of prolonged infections and other bedsores. A new system is needed that eliminates or greatly reduces the chance of spillage when maneuvering the bedpan.

Along the same lines, conventional bedpans become difficult to handle away from the patient. Even if removed from the patient cleanly without spilling, it can be difficult to transport them while avoiding splashing or spilling. This disadvantage is only amplified when remembering the need to ascertain liquid waste levels accurately.

To try and prevent spilling, some bedpans incorporate a splashguard. The bedpans that lack a splashguard can be more difficult to clean than bedpans with a splashguard. Some bedpans that include a splashguard have a sharp edge near the location where the user contacts the bedpan. The sharp edge can cause the user discomfort and increased susceptibility to bedsores.

Yet another problem associated with some bedpans relates to their opaque characteristics. When determining the volume output of a user, an attendant (e.g., a nurse) is required to pour liquid waste into a measurement device like a graduated cylinder. Because the attendant cannot see the contents of an opaque bedpan, the attendant cannot readily determine whether any waste has been deposited in the opaque bedpan. Consequently, in some cases the attendant uses his or her hands to hold back solid waste when pouring the liquid waste into the graduated cylinder.

Further, the opaque characteristics of some bedpans prevents the attendant from readily determining when the bedpan should be emptied. Because the attendant cannot readily view the contents of the bedpan to determine whether the bedpan should be emptied, the user may sit on the bedpan for extended periods of time. These extended periods of time generally increase the likelihood of bedsores formation.

It is desirable to have a system that is configured to avoid spillage of liquid wastes while minimizing discomfort to the patient caused from splashguards. It is further desirable to have a system that allows for the collection of waste fluids and solids in a more convenient way to permit the accurate measurement of waste fluid. Although some strides have been made, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 2 is an exemplary side section view of a bedpan in the bedpan system of FIG. 1 to show the elevation of a screen; and FIG. 3 is an alternative exemplary side section view of the bedpan in the bedpan system of FIG. 1 to show an optional secondary screen.

Figure 1:
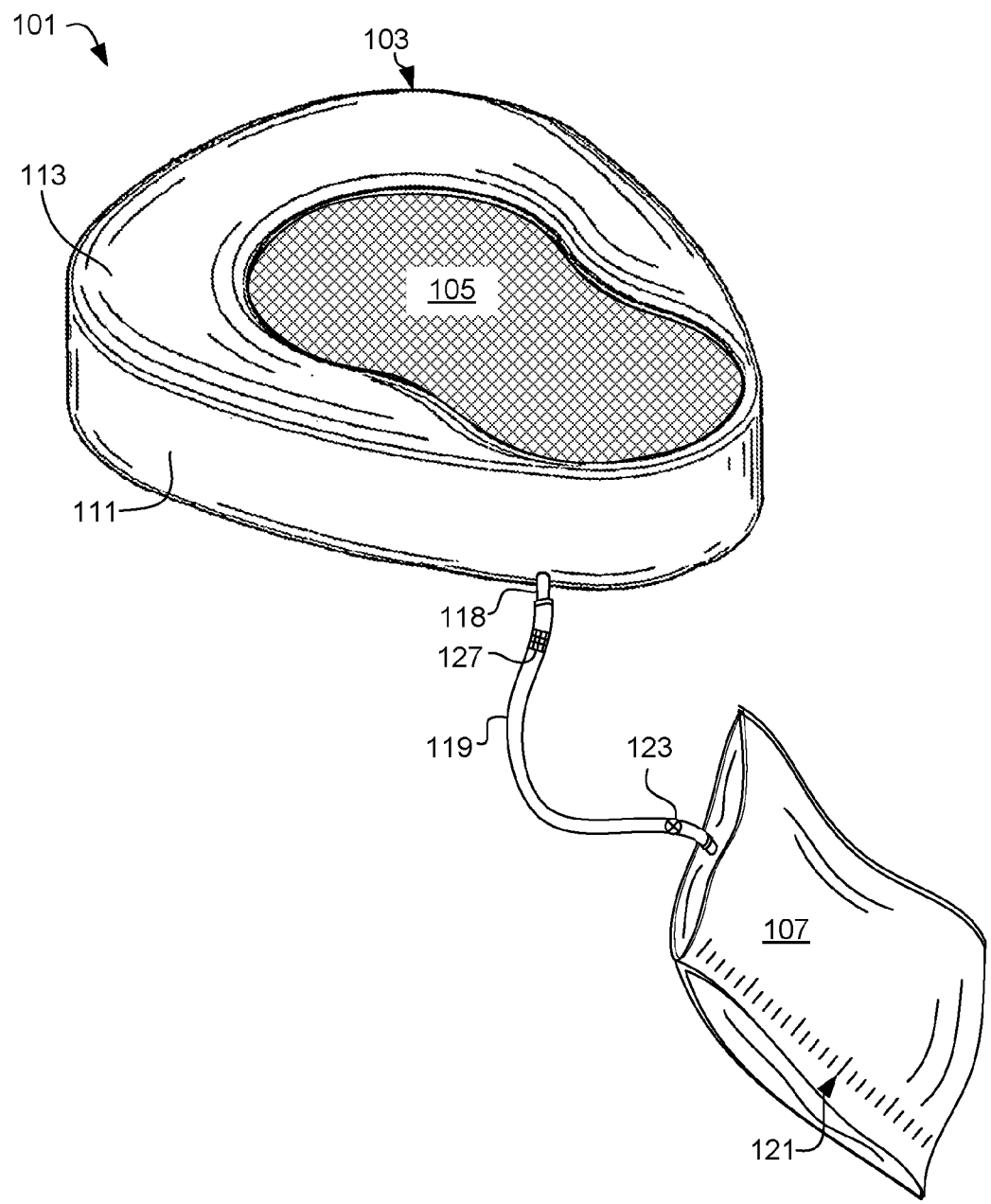
FIG. 1 is a perspective view of a bedpan system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system in accordance with the present application overcomes one or more of the above-discussed problems commonly associated with conventional bedpans. Specifically, the bedpan system of the present application is configured to separate bodily waste within the compartment by using a screen to permit the flowing of liquid waste to pass beyond that of solid waste. The bedpan system is further configured to prevent spillage of waste material during transport or removal from the patent. Spillage is prevented by automatically draining the liquid waste into an exterior storage member. The system further allows for the ability to measure the liquid waste without removing the bedpan from the patient by merely checking the exterior storage member. These and other unique features of the device are discussed below and illustrated in the accompanying drawings.

The device and method will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The bedpan system of the present application is illustrated in the associated drawings. The system includes a main body (i.e. a bedpan) configured to collect solid and liquid bodily waste including fecal matter and urine. The bedpan includes a screen member to separate and/or sort the waste to permit the flow of liquid waste beyond the solid waste. Further included is a storage member external to the bedpan for capturing the liquid waste. System 101 is configured Referring now to the drawings wherein like reference characters identify corresponding or similar elements in form and function throughout the several views. FIGS. 1-3 in the drawings illustrate bedpan system 101. As stated previously, system 101 includes main body 103, an internal screen member 105, and an exterior storage member 107. Main body 103 is configured to collect both solid and liquid waste. Screen member 105 is in communication with main body 103 and is configured to separate the solid waste from the liquid waste. The liquid waste is permitted to flow into storage member 107 in communication with the interior of main body 103. System 101 is configured to be more sanitary compared to legacy devices when disposing of human waste which may accumulate, overflow, or spill.

System 101 is designed and constructed from materials that are lightweight, including plastic, aluminum, and/or composite in nature. Main body 103 is configured to incorporate a rounded outer surface design to allow itself to be placed and removed easily beneath a patient by a healthcare worker. Main body 103 is comprised of a partially enclosed cavity having a floor 109, a side wall 111, and a seat portion 113. Seat portion 113 is integrally formed at the top of wall 111 and is formed in the shape of a toilet seat to provide support for the patient as well as an engagement surface for the patient. Seat portion 113 extends inwardly from wall 111 to define a generally central opening to provide access to the cavity.

Screen member 105 is in communication with main body 103. As seen in FIGS. 2 and 3, screen member 105 is located within the cavity at a predetermined elevation. The precise elevation of screen member 105 is adjustable. The elevation of screen member 105 may be changed by alternating it between attachment members 115. Attachment members 115 are configured to extend into the cavity of main body 103 and secure screen member 105 at a particular distance between seat portion 113 and floor 109. It should also be noted that the construction of screen member 105 may permit itself to be removed from main body 103. For example, screen member 105 may include a hinged portion to permit collapsing so as to fit past seat portion 113.

Screen member 105 is configured to provide separation between the solid waste and the liquid waste. Screen member 105 is has a plurality of ports or apertures to permit the passage of the liquid waste. Member 105 may be a screen mesh or other type of rigid material. Solid wastes accumulate within the cavity and rest on top of member 105 while the liquid waste passes through to floor 109. Screen member 105 is configured to be strengthened sufficiently to support the weight of solid wastes given the support locations around the edges. Although not shown here, it is understood that screen member 105 may be configured to have support at locations away from wall 111. Attachment members 115 may be modified to include center supports. Such supports may be incorporated into the design of main body 103 as well.

Storage member 107 is configured to collect the liquid waste from main body 103. Liquid waste reaches floor 109 and drains through a port 117 into a conduit member 119 for collection by storage member 107. To permit proper drainage of liquid waste, storage member 107 is ideally located below port 117. For example, storage member 107 may be hung along a bedside. Additionally, main body 103 may be sloped along floor 109 to assist in drainage to port 117. Port 117 is illustrated in wall 111 but may be located along other surfaces of main body 103. For example, port 117 may be located anywhere along floor 109. The location of port 117 is not herein limited in location by that of FIGS. 1-3.

Port 117 may be a simple aperture within main body 103 or may include a nozzle 118 to assist in attachment of conduit member 119. Port 117 may be either integrally formed in main body 103 or may be detachable to allow conduit member 119 to be removed and interchanged. FIG. 1 illustrates the use of nozzle 118 in port 117. FIGS. 2 and 3 show port 117 despite being a view of side section views. It is shown to serve as a visual representation.

Conduit member 119 extends between main body 103 and storage member 107 and is configured to maintain fluid communication between each to allow for the proper passage of liquid waste. Conduit member 119 is made from a flexible material to permit the proper alignment and positioning of storage member 107.

Storage member 107 is configured to collect liquid waste draining from main body 103. Storage member 107 may be a flexible device or rigid. An example of storage member 107 is that of a bag. In order to prevent spillage, conduit member 119 releasably couples to member 107 in a sealed manner. Storage member 107 is configured to be removed from conduit member 119. When removed, storage member 107 may be closed to prevent spillage during transportation. In this way, spillage does not occur during drainage or during transportation. Additionally, foreign substances are prevented from entering from the exterior of the storage member.

It is important to keep the contents of liquid waste free from contaminants. Often the volume of liquid waste is needed to be measured when monitoring a patient. The use of screen member 105 assists in this process by separating the liquid waste from the solid waste. The screen member acts as a filter. By collecting the liquid waste in an external member, the liquid waste is more accessible to health care personnel. Storage member 107 is optionally, at least partially opaque, to permit visual inspection of collected waste volume. Additionally, storage member 107 may further include measurement indicia 121 to allow for quick measurement inspections of the fluid. This allows for the measurement of the liquid waste without the need to remove the liquid waste from system 101 or by the detachment of storage member 107 from conduit member 119.

As said previously, storage member 107 is releasably coupled to conduit member 119. System 101 is configured to prevent spillage by allowing for the closure of storage member 107 when detached, but system 101 is also optionally configured to include a valve 123 in communication with the drainage path between main body 103 and storage member 107. Valve 123 is configured to regulate the flow of liquid waste into storage member 107. Valve 123 may operate between an open and a closed orientation, such that when storage member 107 is to be removed, valve 123 is first oriented to a closed position to prevent leaking. When the storage member is reattached, valve 123 may then be operated into an open orientation. It should be noted that storage member 107 may be interchanged or replaced as necessary.

As seen in FIGS. 2 and 3, side section views of screen member 105 is shown in main body 103. System 101 may further include a secondary screen member 125. Member 125 may replace or act along with screen member 105 as shown from the two figures. A difference with the secondary screen member is that it is located adjacent to port 117 and does not extend between internal surfaces of walls 111. Whereas screen member 105 prevents solid waste from contacting floor 109, secondary screen member 125 is configured to allow solid waste to reach floor 109, but prevent it from flowing into conduit member 119. A disadvantage to relying on secondary screen member 125 only is that solid waste may fall so as to dam up passage of the liquid waste, thereby hindering or preventing proper drainage. Usage of member 125 with screen member 105 acts as a secondary filter and is more ideally suited as such. Additional filtering may be provided by use of an optional filter 127 located in association with conduit member 119.

System 101 has various commercial and residential applications for preventing spillage and the spread of infections. This increases the sanitary nature of healthcare which is ideally suited for the home healthcare industry along with hospitals, clinics, private medical practices, and outpatient services. Additionally, system 101 is suited for veterinary services.

The current application has many advantages over the prior art including at least the following: (1) two storage areas for waste matter that are structurally separated; (2) a bedpan fluidly connected to a storage member; (3) an elevated screen member to elevate discharged waste above the floor of the bedpan; (4) visual measurement of the liquid waste through the storage member; (5) reduced spillage; and (6) simplified cleaning and disposal of waste.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A bedpan system for collecting waste matter, comprising:
a main body configured to collect both solid and liquid waste;
a screen member in communication with the main body and configured to separate the solid waste from the liquid waste;
a storage member in communication with the interior of the main body and configured to collect the liquid waste passing through the screen member; and
a secondary screen member adjacent an exit port in the main body, the exit port configured to pass the liquid waste from the main body, the secondary screen member configured to prevent solid wastes from entering the storage member.

2. The system of claim 1, wherein the screen member is configured to elevate the solid waste above a bottom surface of the main body.

3. The system of claim 1, wherein the screen member is located between a seat portion and a floor of the interior of the main body.

4. The system of claim 1, wherein the storage member is located below the main body to permit the flowing of liquid waste.

5. The system of claim 1, wherein the storage member includes measurement indicia configured to permit for the measurement of liquid waste.

6. The system of claim 1, wherein the storage member is configured to sort the liquid waste from the solid waste and contain the liquid waste in a measurement device, thereby permitting the measurement of liquid waste without the need to remove the liquid waste from the storage member.

7. The system of claim 1, wherein the storage member is configured to be selectively closed to permit the transportation of the liquid waste without spillage.

8. The system of claim 1, further comprising:
a valve in communication with the liquid waste between the main body and the storage member, the valve configured to regulate the flow of liquid waste into the storage member.

9. The system of claim 8, wherein the valve is configured to stop the flow of liquid waste when the storage member is removed from the main body.

10. The system of claim 1, wherein the storage member is interchangeable.

11. The system of claim 1, wherein the storage member is configured to be hung along a bedside.

12. The system of claim 1, wherein the storage member is opaque.

13. The system of claim 1, wherein the screen is removable.

14. The system of claim 1, wherein the screen member is located adjacent to a port in the main body, the exit port configured to pass the liquid waste from the main body, the screen member configured to prevent solid wastes from entering the storage member.

15. The system of claim 1, wherein the location of the screen member is adjustable within the main body.

16. The system of claim 1, further comprising:
a conduit member extending between the storage member and the main body and configured to maintain fluid communication between each.

17. The system of claim 16, wherein the conduit member further includes a filter.

18. A bedpan system for collecting waste matter, comprising:
a main body configured to collect both solid and liquid waste;
a screen member in communication with the main body and configured to separate the solid waste from the liquid waste;
a storage member in communication with the interior of the main body and configured to collect the liquid waste passing through the screen member; and
a conduit member extending between the storage member and the main body and configured to maintain fluid communication between each and wherein the conduit member further includes a filter.

19. The system of claim 18, wherein the screen member is configured to elevate the solid waste above a bottom surface of the main body.

20. The system of claim 18, wherein the screen member is located between a seat portion and a floor of the interior of the main body.

* * * * *